(12) United States Patent
Swanberg (10) Patent No.: US 10,102,003 B2
(45) Date of Patent: *Oct. 16, 2018

(54) INTELLIGENT CONTEXT MANAGEMENT

(71) Applicant: International Business Machines Corporation, Armonk, NY (US)

(72) Inventor: Randal C. Swanberg, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 765 days.

This patent is subject to a terminal disclaimer.

(21) Appl. No.: 13/781,254

(22) Filed: Feb. 28, 2013

(65) Prior Publication Data

US 2014/0244985 A1 Aug. 28, 2014

Related U.S. Application Data (63) Continuation of application No. 13/666,328, filed on Nov. 1, 2012.

(51) Int. Cl.
 *G06F 9/38* (2018.01)
 *G06F 9/30* (2018.01)
 (Continued)

(52) U.S. Cl.
 CPC ........ *G06F 9/3851* (2013.01); *G06F 9/30098* (2013.01); *G06F 9/462* (2013.01); *G06F 9/467* (2013.01); *G06F 9/4843* (2013.01)

(58) Field of Classification Search
 CPC ................................. G06F 9/324; G06F 9/462
 See application file for complete search history.

(56) References Cited

U.S. PATENT DOCUMENTS 4,413,339 A * 11/1983 Riggle et al. ................ 714/765
5,481,719 A 1/1996 Ackerman et al.
(Continued)

FOREIGN PATENT DOCUMENTS

| CN | 1549968 A | 11/2004 |
| CN | 1720494 A | 1/2006 |
| CN | 1993683 A | 7/2007 |

OTHER PUBLICATIONS

Anonymous, "A method for fast context switches in architecturally extended processor cores using speculation", http://priorartdatabase.com/IPCOM/000203051 (Jan. 17, 2011).

(Continued)

*Primary Examiner* — Aimee Li
*Assistant Examiner* — William V Nguyen
(74) *Attorney, Agent, or Firm* — Thomas E. Tyson; Jack V. Musgrove (57) ABSTRACT

Intelligent context management for thread switching is achieved by determining that a register bank has not been used by a thread for a predetermined number of dispatches, and responsively disabling the register bank for use by that thread. A counter is incremented each time the thread is dispatched but the register bank goes unused. Usage or non-usage of the register bank is inferred by comparing a previous checksum for the register bank to a current checksum. If the previous and current checksums match, the system concludes that the register bank has not been used. If a thread attempts to access a disabled bank, the processor takes an interrupt, enables the bank, and resets the corresponding counter. For a system utilizing transactional memory, it is preferable to enable all of the register banks when thread processing begins to avoid aborted transactions from register banks disabled by lazy context management techniques.

9 Claims, 5 Drawing Sheets

(51) Int. Cl.
*G06F 9/46* (2006.01)
*G06F 9/48* (2006.01)

(56) References Cited

U.S. PATENT DOCUMENTS

| | | | |
|---|---|---|---|
| 5,655,132 A | 8/1997 | Watson | |
| 6,061,711 A | 5/2000 | Song et al. | |
| 6,408,325 B1 | 6/2002 | Shaylor | |
| 7,478,225 B1 * | 1/2009 | Brooks | G06F 9/3836 712/214 |
| 7,739,565 B1 * | 6/2010 | Lesea | 714/725 |
| 2003/0105932 A1 * | 6/2003 | David | G06F 1/3203 711/167 |
| 2005/0138442 A1 * | 6/2005 | Keller, Jr. | G06F 1/3203 713/300 |
| 2006/0150162 A1 * | 7/2006 | Mongkolsmai | G06F 11/3466 717/131 |
| 2006/0168463 A1 * | 7/2006 | Terechko | G06F 1/3203 713/324 |
| 2007/0101076 A1 * | 5/2007 | Dixon | G06F 9/463 711/161 |
| 2009/0172371 A1 * | 7/2009 | Joao | G06F 9/3842 712/240 |
| 2009/0198966 A1 * | 8/2009 | Gschwind | G06F 9/30036 712/208 |
| 2010/0011345 A1 * | 1/2010 | Hickerson | G06F 11/3632 717/130 |
| 2010/0332949 A1 * | 12/2010 | d'Abreu | G06F 11/1076 714/766 |
| 2011/0078414 A1 * | 3/2011 | Olson et al. | 712/208 |
| 2011/0145595 A1 * | 6/2011 | Kim | G06F 21/556 713/189 |

OTHER PUBLICATIONS

IBM, "Method of saving power in a register file supporting multiple SMT modes, using a free list stack to manage allocation/deallocation of the register file pointers"; http://www.ip.com/pubview/IPCOM000167259D (Feb. 5, 2008).

Nuth, Peter, et al., "A Mechanism for Efficient Context Switching", Proc. IEEE Int'l. Conf. on Computer Design: VLSI in Computers and Processors, pp. 301-304 (1991).

* cited by examiner

INTELLIGENT CONTEXT MANAGEMENT

CROSS-REFERENCE TO RELATED APPLICATION

This application is a continuation of copending U.S. patent application Ser. No. 13/666,328 filed Nov. 1, 2012, which is hereby incorporated.

BACKGROUND OF THE INVENTION

Field of the Invention

The present invention generally relates to computer systems, and more particularly to a method of managing thread contexts in a multithreading processor.

Description of the Related Art

Today's high performance computer systems use multiple processors to carry out various computer programs such as software applications and operating systems. In a symmetric multi-processor (SMP) computer, all of the processing units are generally identical, that is, they all use a common set or subset of instructions and protocols to operate, and generally have the same architecture. Each processing unit may further include multiple processor cores which actually execute the program instructions to operate the computer. The processor cores may function according to reduced instruction set computing (RISC) techniques, and may employ both pipelining and out-of-order execution of instructions to further improve the performance of the superscalar architecture.

In a superscalar architecture, instructions may be completed in-order and out-of-order. In-order completion means no instruction can complete before all instructions dispatched ahead of it have been completed. Out-of-order completion means that an instruction is allowed to complete before all instructions ahead of it have been completed, as long as predefined rules are satisfied. Within a pipeline superscalar processor, instructions are first fetched, decoded and then buffered. Instructions can be dispatched to execution units as resources and operands become available. Additionally, instructions can be fetched and dispatched speculatively based on predictions about branches taken. The result is a pool of instructions in varying stages of execution, none of which have completed by writing final results to the system memory hierarchy. As resources become available and branches are resolved, the instructions are retired in program order, thus preserving the appearance of a machine that executes the instructions in program order. Overall instruction throughput can be further improved by modifying the hardware within the processor, for example, by having multiple execution units within a single processor core.

Figure 1:
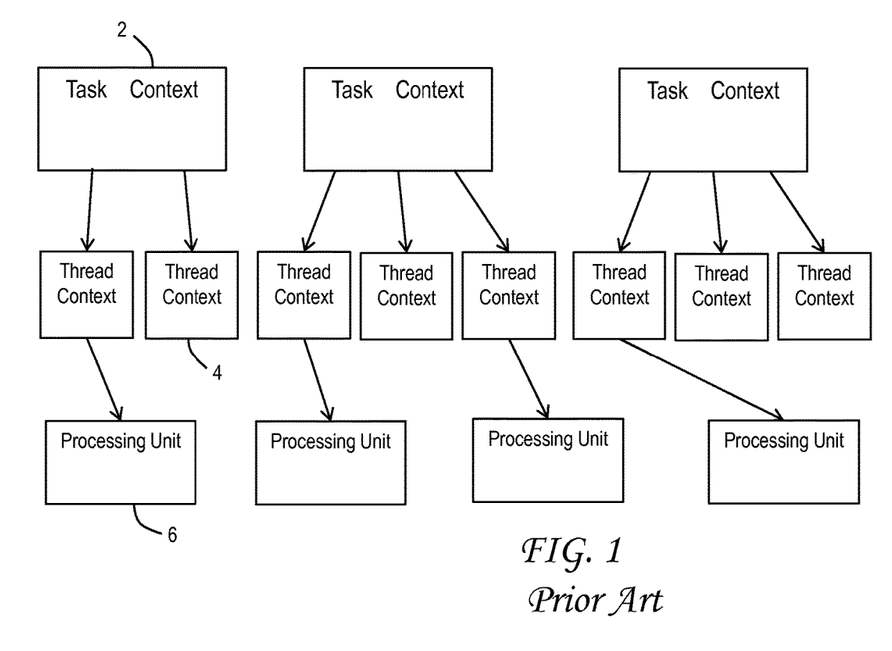
FIG. 1 is a pictorial representation for a simplified example of conventional hardware multithreading.

Modern computer systems also use a computing technique known as hardware multithreading to independently execute smaller sequences of instructions called threads or contexts. When a processor, for any of a number of reasons, stalls and cannot continue processing or executing one of these threads, the processor can switch to another thread. The term "multithreading" as used by those skilled in the art of computer processor architecture is not the same as the software use of the term in which a process is subdivided into multiple related threads. Software multithreading requires substantial involvement by the operating system which manipulates and saves data from registers to main memory and maintains the program order of related and dependent instructions before a thread switch can occur. Software multithreading does not require nor is it concerned with hardware multithreading and vice versa. Hardware multithreading manipulates hardware-architected registers, execution units and pipelined processors to maintain the state of one or more independently executing sets of instructions (threads) in the processor hardware. Hardware threads could be derived from, for example, different tasks in a multitasking system, different threads compiled from a software multithreading system, or from different input/output processors. In each of these examples of hardware multithreading, more than one thread can be independently maintained in a processor's registers. FIG. 1 illustrates a simplified example of multithreading. Three task contexts 2 each have associated thread contexts 4 which are intermittently swapped out for execution among four processors (processor cores) 6. Multiple threads from the same task need not be carried out on a single processor but rather can be distributed among all of the available processors. When the set of instructions comprising a thread have been completed, the thread and its context are retired from the processor.

Simultaneous multithreading (SMT) is a processor design feature that combines hardware multithreading with superscalar processor technology to allow multiple threads to issue instructions each cycle. Unlike other hardware multi-threaded architectures in which only a single hardware context (i.e., thread) is active on any given cycle, SMT permits all thread contexts to simultaneously compete for and share processor resources. Unlike conventional superscalar processors, which suffer from a lack of per-thread instruction-level parallelism (ILP), simultaneous multi-threading uses multiple threads to compensate for low single-thread ILP. The performance consequence is significantly higher instruction throughput and program speedups on a variety of workloads that include commercial databases, web servers and scientific applications in both multi-programmed and parallel environments.

The POWER7 processing unit designed by International Business Machines Corporation has eight cores and can select between three threading modes using a single thread, two threads, or four threads per core, for a maximum of 32 possible threads being simultaneously executed in the processing unit. In the POWER processor architecture, the software-visible machine state (machine registers/context) is divided among fixed point or general purpose registers (GPRs), floating point registers (FPRs), vector registers (VRs), and vector-scalar registers (VSRs). The processor hardware includes bits in a machine status register that enable or disable access to the FPRs, VRs and/or VSRs for context switching. This feature enables an operating system to manage access to those facilities and implement schemes such as deferred ("lazy") state management. That is, when dispatching a thread the operating system will only restore its fixed point state (GPRs), and access to the other facilities (FPRs, VRs, VSRs) will be disabled. If the thread does thereafter attempt to use one of those facilities, an interrupt will result and the operating system can then restore the needed state and enable access to the requested facility.

SUMMARY OF THE INVENTION

The present invention is generally directed to a method of intelligent context management for thread switching in a processor, by determining that a given register bank has not been used by a particular thread for a predetermined number of dispatches of the particular thread and responsively disabling the given register bank for use by the particular thread. In the illustrative implementation, the determination that the register bank has not recently been used is made by incrementing a counter each time the thread is dispatched but the register bank goes unused. Usage or non-usage of the register bank is inferred by comparing a previous checksum for a state of the register bank from the previous dispatch to a current checksum for a state of the register bank from the current dispatch. If the previous and current checksums are the same, the system concludes that the register bank has not been used. The invention may be implemented in software, e.g., the operating system of the computer, or in hardware, e.g. control logic circuitry embedded in the processor core. For a system utilizing transactional memory, it is preferable to enable all of the register banks when processing of the thread begins. In an exemplary embodiment, the register banks include general purpose registers, floating point registers, vector registers, and vector-scalar registers, but only the floating point registers, vector registers, and vector-scalar registers are selectively disabled, i.e., the general purpose registers are always enabled (saved/restored).

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

While hardware multithreading has greatly increased the processing throughput of modern microprocessors, there are still many limitations associated with the different approaches to thread switching. Lazy context management works wells if a thread only occasionally or intermittently needs access to the FPRs, VRs, or VSRs, thereby reducing normal context switch time. However, if a thread is constantly using one of those facilities, then after every context switch there is increased latency due to the constant interrupts required to get the state restored.

This problem has been magnified in state-of-the-art systems by the recent addition of transactional memory. Transactional memory is a way of allowing speculative concurrent access to shared memory with guarantees of atomicity. It replaces the practice of locking data until a complex job is complete, an approach that can slow down other computer operations. Transactional memory attempts to simplify concurrent or parallel programming by allowing a group of load and store instructions to execute in an atomic manner. It is guaranteed that either all instructions of the transaction complete successfully, or no effects of the instructions of the transaction occur, i.e., the transaction is aborted and any changes made by the execution of any instruction in the transaction are rolled back. When a program enters a transaction, a snapshot of all of the machine register states is captured inside the processor chip in case of a roll back. A thread in a transaction consequently cannot have its register states lazily restored to continue with the transaction since each of the interrupts causes the active transaction to be aborted and restarted.

As an alternative to lazy context management, the thread control logic can always save and restore each of the FPRs, VRs, and VSRs at context switch time. If a thread is constantly using these facilities, then this approach works well and avoids excess interrupts or interference with transactional memory. However, if a thread infrequently needs access to one of these register banks (or only a one-time use), every context switch becomes inefficient as it saves and restores unneeded state information.

In light of the foregoing, it would be desirable to devise an improved method of context management which could make thread switching less computationally intensive for a variety of circumstances. It would be further advantageous if the method could retain benefits of alternative approaches such as lazy context management. The present invention achieves these objects by dynamically adjusting and optimizing performance based on the current thread behavior. An intelligent context management system in accordance with the present invention can detect when the thread is consistently using all the resources on every dispatch, and when the thread is not using the resources, allowing self-tuning of the state/restore to match the current need. In the illustrative embodiments, the operating system maintains multiple machine state checksums, one for each functional unit to be selectively restored (e.g., checksum for floating point state, checksum for vector media extension state, and checksum for vector-scalar state), and uses tunable statistics to base decisions on when to save a unit's state, and whether to restore its state.

Figure 2:
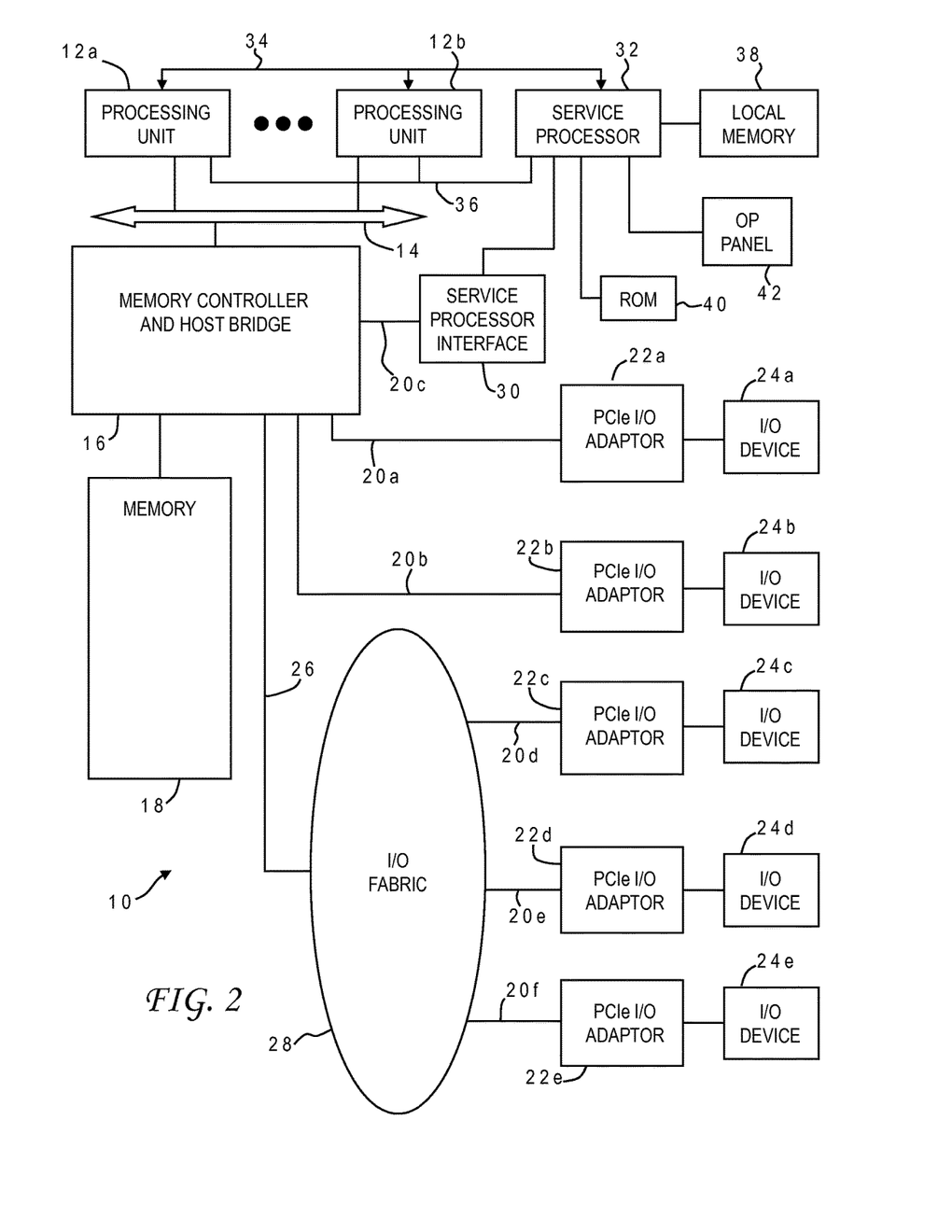
FIG. 2 is a block diagram of a computer system constructed in accordance with one embodiment of the present invention, wherein processing units use intelligent context management for thread switching.

With reference now to the figures, and in particular with reference to FIG. 2, there is depicted one embodiment 10 of a computer system constructed in accordance with one implementation of the present invention. Computer system 10 is a symmetric multiprocessor (SMP) system having a plurality of processing units 12a, 12b connected to a system bus 14. Processing units 12a, 12b may each include multiple processor cores. System bus 14 is further connected to a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches.

MC/HB 16 also has an interface to peripheral component interconnect (PCI) Express links 20a, 20b, 20c. Each PCI Express (PCIe) link 20a, 20b is connected to a respective PCIe adaptor 22a, 22b, and each PCIe adaptor 22a, 22b is connected to a respective input/output (I/O) device 24a, 24b.

MC/HB 16 may additionally have an interface to an I/O bus 26 which is connected to a switch (I/O fabric) 28. Switch 28 provides a fan-out for the I/O bus to a plurality of PCI links 20d, 20e, 20f. These PCI links are connected to more PCIe adaptors 22c, 22d, 22e which in turn support more I/O devices 24c, 24d, 24e. The I/O devices may include, without limitation, a keyboard, a graphical pointing device (mouse), a microphone, a display device, speakers, a permanent storage device (hard disk drive) or an array of such storage devices, an optical disk drive, and a network card. Each PCIe adaptor provides an interface between the PCI link and the respective I/O device. MC/HB 16 provides a low latency path through which processing units 12a, 12b may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20c connects MC/HB 16 to a service processor interface 30 to allow communications between I/O device 24a and a service processor 32. Service processor 32 is connected to processors 12a, 12b via a JTAG interface 34, and uses an attention line 36 which interrupts the operation of processors 12a, 12b. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer system 10 may include modifications of these hardware components or their interconnections, or additional components, so the depicted example should not be construed as implying any architectural limitations with respect to the present invention.

When computer system 10 is initially powered up, service processor 32 uses JTAG interface 34 to interrogate the system (host) processing units 12a, 12b and MC/HB 16. After completing the interrogation, service processor 32 acquires an inventory and topology for computer system 10. Service processor 32 then executes various tests such as built-in-self-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed. Executable code is loaded into memory 18 and service processor 32 releases host processors 12a, 12b for execution of the program code, e.g., an operating system (OS) which is used to launch applications, results of which may be stored in a hard disk drive of the system (an I/O device 24). While host processors 12a, 12b are executing program code, service processor 32 may enter a mode of monitoring and reporting any operating parameters or errors, such as the cooling fan speed and operation, thermal sensors, power supply regulators, and recoverable and non-recoverable errors reported by any of processors 12a, 12b, memory 18, and MC/HB 16. Service processor 32 may take further action based on the type of errors or defined thresholds.

As will be appreciated by one skilled in the art, aspects of the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable media may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this invention, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, written for a variety of platforms such as an AIX environment or operating systems such as Windows 7 or Linux. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. Such computer-readable storage media excludes transitory media.

The computer program instructions may further be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As computer system 10 carries out program instructions for the OS or software applications, it uses novel context management techniques for thread switching among the different processor cores. Accordingly, a system embodying the invention may include conventional aspects of thread technology, and these details will become apparent to those skilled in the art upon reference to this disclosure.

Figure 3:
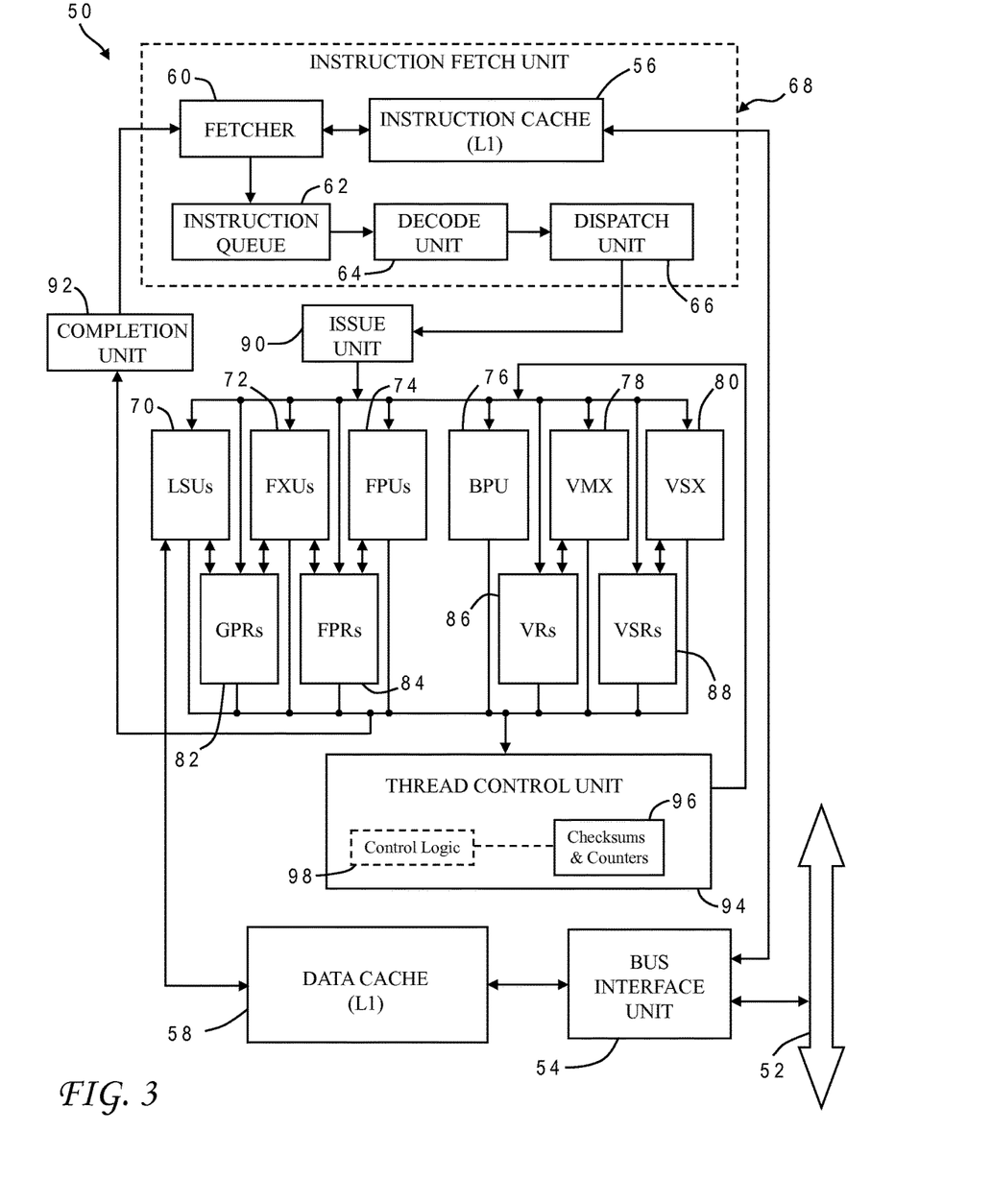
FIG. 3 is a block diagram of a processor core constructed in accordance with one embodiment of the present invention, the processor core having facilities including various execution units and register banks.

Referring now to FIG. 3, there is depicted one embodiment 50 of a processor core constructed in accordance with one embodiment of the present invention. Each of the processing units 12*a*, 12*b* of FIG. 2 may include multiple instances of processor core 50, such as eight processor cores per processing unit. Other features not shown may be included within a processing unit, such as L2 caches for each core, and an L3 cache used by all cores on the same unit.

Processor 50 is generally a single integrated circuit superscalar microprocessor, and includes various execution units, registers, buffers, memories, and other functional units which are all formed by integrated circuitry. Processor 50 operates according to reduced instruction set computing (RISC) techniques, and is coupled to a system or fabric bus 52 via a bus interface unit (BIU) 54 within processor 50. BIU 54 controls the transfer of information between processor 50 and other devices coupled to system bus 52, such as a main memory or an L2 cache memory, by participating in bus arbitration. Processor 50, system bus 52, and the other devices coupled to system bus 52 together form a host data processing system.

BIU 54 is connected to an instruction cache 56 and to a data cache 58 within processor 50. High-speed caches, such as those within instruction cache 56 and data cache 58, enable processor 50 to achieve relatively fast access time to a subset of data or instructions previously transferred from main memory to the caches, thus improving the speed of operation of the host data processing system. Instruction cache 56 is further coupled to a fetcher 60 which fetches instructions for execution from instruction cache 56 during each cycle. Fetcher 60 temporarily stores sequential instructions within an instruction queue 62 for execution by other execution circuitry within processor 50. From the instruction queue 62, instructions pass sequentially through the decode unit 64 where they are translated into simpler operational codes (iops) and numerous control signals used by the downstream units. After being decoded, instructions are processed by the dispatch unit 66, which gathers them into groups suitable for simultaneous processing and dispatches them to the issue unit 90. Instruction cache 56, fetcher 60, instruction queue 62, decode unit 64 and dispatch unit 66 are collectively referred to as an instruction fetch unit 68.

The execution circuitry of processor 50 has multiple execution units for executing sequential instructions, including one or more load-store units (LSUs) 70, one or more fixed point units (FXUs) 72, floating point units (FPUs) 74, a branch processing unit (BPU) 76, a vector multimedia extension (VMX) 78, and a vector-scalar extension (VSX) 80. These execution units 70, 72, 74, 76, 78 and 80 execute one or more instructions of a particular type of sequential instructions during each processor cycle. For example, FXUs 72 perform fixed-point mathematical and logical operations such as addition, subtraction, shifts, rotates, and XORing, utilizing source operands received from specified general purpose registers (GPRs) 82. Following the execution of a fixed-point instruction, FXUs 72 output the data results of the instruction to selected GPRs 82. FPUs 74 perform single and double-precision floating-point arithmetic and logical operations, such as floating-point multiplication and division, on source operands received from floating-point registers (FPRs) 84. FPUs 74 output data resulting from the execution of floating-point instructions to selected FPRs 84. LSUs 70 execute floating-point and fixed-point instructions which either load data from memory (i.e., either data cache 58 or main memory) into selected GPRs 82 or FPRs 84, or which store data from selected GPRs 82 or FPRs 84 to system memory. BPU 76 performs condition code manipulation instructions and branch instructions. VMX 78 executes single instruction operations that act on multiple operand data to produce multiple results using vector computation, and output data resulting from the execution of vector instructions to selected vector registers (VRs) 86. VSX 80 executes vector-scalar instructions which extend single instruction, multiple data (SIMD) processing with support for regular floating point, decimal floating point and vector execution, and output data resulting from the execution of vector-scalar instructions to selected vector-scalar registers (VSRs) 88.

Processor 50 may employ both pipelining and out-of-order execution of instructions to further improve the performance of its superscalar architecture, but the present invention is particularly advantageous when used with in-order program execution or in cases where out-of-order execution capabilities are limited. For out-of-order processing, instructions can be executed by LSUs 70, FXUs 72, FPUs 74, BPU 76, VMX 78 and VSX 80 in any order as long as data dependencies are observed. In addition, instructions may be processed by each of those facilities as a sequence of pipeline stages, in particular, five distinct pipeline stages: fetch, decode/dispatch, execute, finish, and completion.

During the fetch stage, fetcher 60 retrieves one or more instructions associated with one or more memory addresses from instruction cache. Sequential instructions fetched from instruction cache 56 are stored by fetcher 60 within instruction queue 62. The instructions are processed by the decode unit 64 and formed into groups by dispatch unit 66. Dispatch unit 66 allocates a register within register banks 82, 84, 86 or 88 for each dispatched instruction's resultant data, and issue unit 90 issues one or more instructions to the execution units. Upon dispatch, instructions are also stored within the multiple-slot completion buffer of a completion unit 92 to await completion. Processor 10 tracks the program order of the dispatched instructions during out-of-order execution utilizing unique instruction identifiers.

During the execute stage, execution units 70, 72, 74, 76, 78 and 80 execute instructions received from issue unit 90 opportunistically as operands and execution resources for the indicated operations become available. Each of execution units is preferably equipped with a reservation station that stores instructions dispatched to that execution unit until operands or execution resources become available. Then, the execution units notify completion unit 92 which instructions have finished execution. Finally, instructions are completed in program order out of the completion buffer of completion unit 92. Instructions executed by FXUs 72, FPUs 72, VMX 78 and VSX 80 are completed by transferring data results of the instructions from the execution units to GPRs 82, FPRs 84, VRs 86 and VSRs 88. Load and store instructions executed by LSUs 70 are completed by transferring the finished instructions to a completed store queue or a completed load queue from which the indicated load/store operations will be performed.

The execution units may utilize additional registers not shown, for example, special purpose registers, conditional registers, model-specific (machine-specific) registers, control and status registers, or constant registers holding read-only values. The various registers and execution units of processor 50 may be duplicated to allow processing of multiple threads in the single processor core. Processor 50 accordingly includes a thread control unit used to achieve concurrent operation of the threads. The individual threads must cooperate with each other since, once a thread is running, no other thread can run until the current thread releases control. Thread control unit 94 includes one or more queues for prioritizing (scheduling) threads, an arbiter to control the execution of the prioritized threads, and state machines for shifting execution control between threads.

Thread control unit 94 also includes a save area for saving and restoring thread contexts, i.e., the states of the various register banks 82, 84, 86, 88. However, in the present invention, only selected facilities are saved or restored depending upon the real-time behavior of the threads. For each thread, the OS can be programmed to maintain a checksum on the FPU, VMX and VSX register contents in the thread machine state save area. When a thread is to be switched out (undispatched), the in-register state for a given unit (FPU, VMX, VSX) can be checksummed and compared to the previously saved checksum. If the current checksum for a bank matches its old checksum, the OS can infer that the thread did not use the corresponding execution unit since the last dispatch of the same thread. The checksum match is not deterministic that no state change occurred, as the state could have changed but the checksum computes the same by mere coincidence. However, the checksum match is still an intelligent hint indicating that the thread is probably no longer using that unit. While more complicated schemes could be employed to more accurately keep track of register bank utilization, the checksums can be generated quickly and without much overhead.

If the OS determines that the checksums match, it can increment a counter to keep track of how many dispatches the particular thread has undergone without using a given register bank. Thereafter (when the thread is later re-dispatched), the OS can compare the current count of dispatches that the bank has not been used to some predetermined threshold and, if the OS determines that the threshold has been exceeded, it can responsively disable that bank until the thread attempts to access that bank again (for example, resorting to lazy save/restores). Any bank that has been disabled need not be saved on future context switches out. If the thread does later access that bank, the OS can reset the counter for this thread/bank, and repeat the foregoing process.

The threshold value for the unused dispatch count is preferably configurable (programmable), and the OS can even tune the threshold value based on other factors. For instance, the OS might tune the threshold to be higher for threads using transactional memory and lower for threads not using transactional memory. It might also factor in frequency of aborted transactions for a thread in adjusting the threshold. For long-lived threads, the OS can also accumulate longer samples of heuristics and further tune the threshold. For example if the default threshold N is three dispatches without a change in checksum, but the OS learns over time that the particular thread on average seems to always uses a particular functional unit every four or five dispatches, the OS may want to tune the threshold for that thread to be six dispatches with no change. The OS can continue to tune the threshold up and down over the life of a thread attempting to always be at the most optimistic setting for the thread's recent behavior. In all cases, the tradeoff between the additional processing path length of saving and restoring the additional state each context switch versus the efficiency gained by deferred lazy management and/or reduced transactional memory interference must be considered in determining the threshold. Different threshold values could be provided for different facilities.

Figure 4:
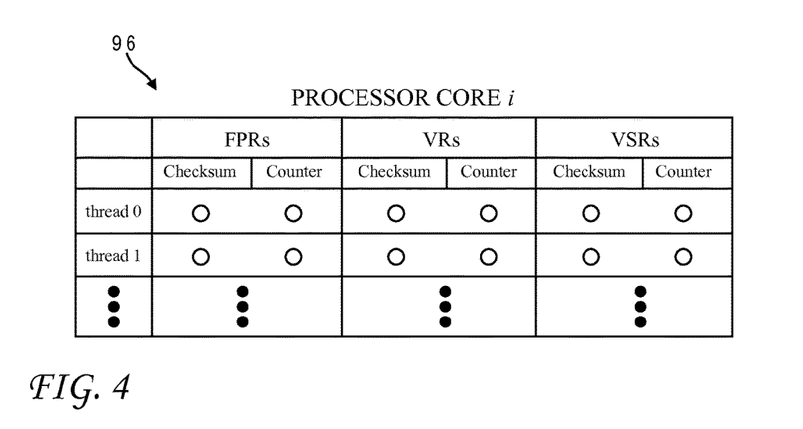
FIG. 4 is a table illustrating how checksums are maintained for selected processor facilities (register banks) to determine whether a given facility was used by a particular thread since its previous dispatch, and counters are incremented to track how many dispatches have occurred without a particular thread using a given facility.

FIG. 4 depicts an array 96 of checksum and counter cells, for each thread and each targeted facility. Array 96 is preferably located within thread control unit 94 but could be located elsewhere, even off-chip. The OS can maintain separate checksum and counter cells for each thread context it is managing. While the illustrative embodiment uses the OS (software) to carry out the control logic of this intelligent context management, those skilled in the art will appreciate that various aspects could be implemented in hardware, i.e., a future processor design having control logic circuitry 98 (FIG. 3) to automatically maintain and compare the checksums, and/or automatically increment the counters and compare them to the threshold value(s), making the thread switches that much more efficient. Advantageously, since all of the data needed to compute the checksums are already in registers, no memory operations are needed to compute the sums outside of saving to a couple of scratch (temporary) registers.

On a context switch out, if the current checksum for a unit does not match the thread's last saved checksum the OS concludes that the thread is still actively using the unit, and clears the corresponding history count (reset to zero). The checksum is thus used as a heuristic in forming the decision of when to stop speculatively saving/restoring the state and instead resorting back to the lazy (disable and interrupt) method. This intelligent approach to context management thereby allows a processor to achieve the benefits of both lazy context management and its alternative (always saving/restoring the register banks) If the current and old checksums for a thread happened to match over N intervals even though there were changes in the register state, the worst case would simply require disabling access to the unit and quickly determining via an interrupt that the thread is still using the unit, so the inconvenience is transient and minor compared to the repeated interrupts that can occur with conventional context management techniques.

An OS carrying out the present invention can initially begin with either of two possible default policies. In one policy, access to the targeted facilities (FPRs, VRs, VSRs) is initially disabled and once a thread references one of these facilities the corresponding access bit is enabled to allow automatic save/restores of that thread on every context switch (until its counter exceeds the preset threshold). In the other policy, the OS restores all of the register states for a thread on dispatch, and dispatches it with access to all of the units. This latter policy avoids any extra interrupts and also avoids interfering with transactional memory, so it is considered preferable for systems utilizing transactional memory.

Figure 5A:
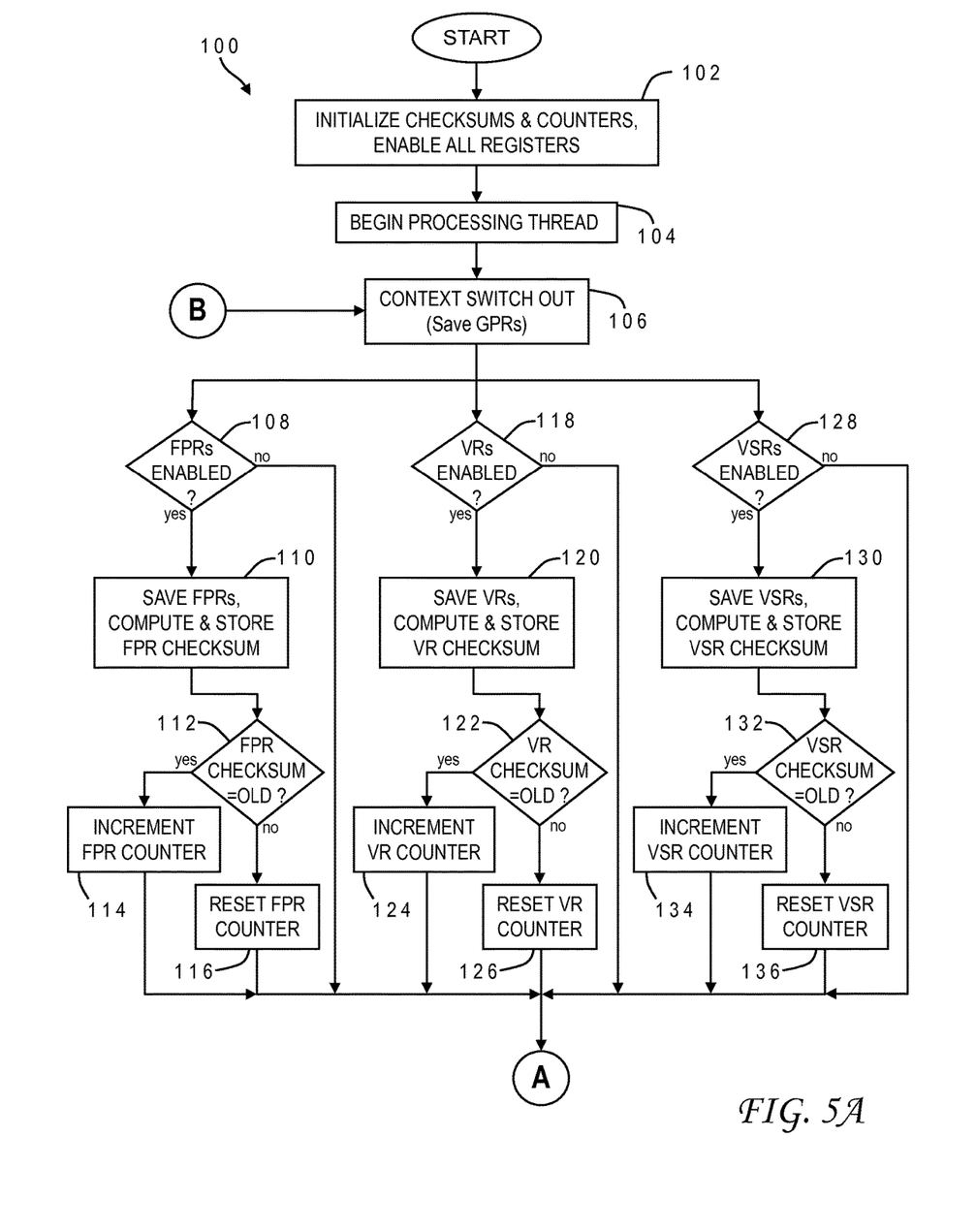
FIGS. 5A and 5B together form a single chart illustrating the logical flow for an intelligent context management process carried out for the processor core of FIG. 3 in accordance with one implementation of the present invention.
Figure 5B:
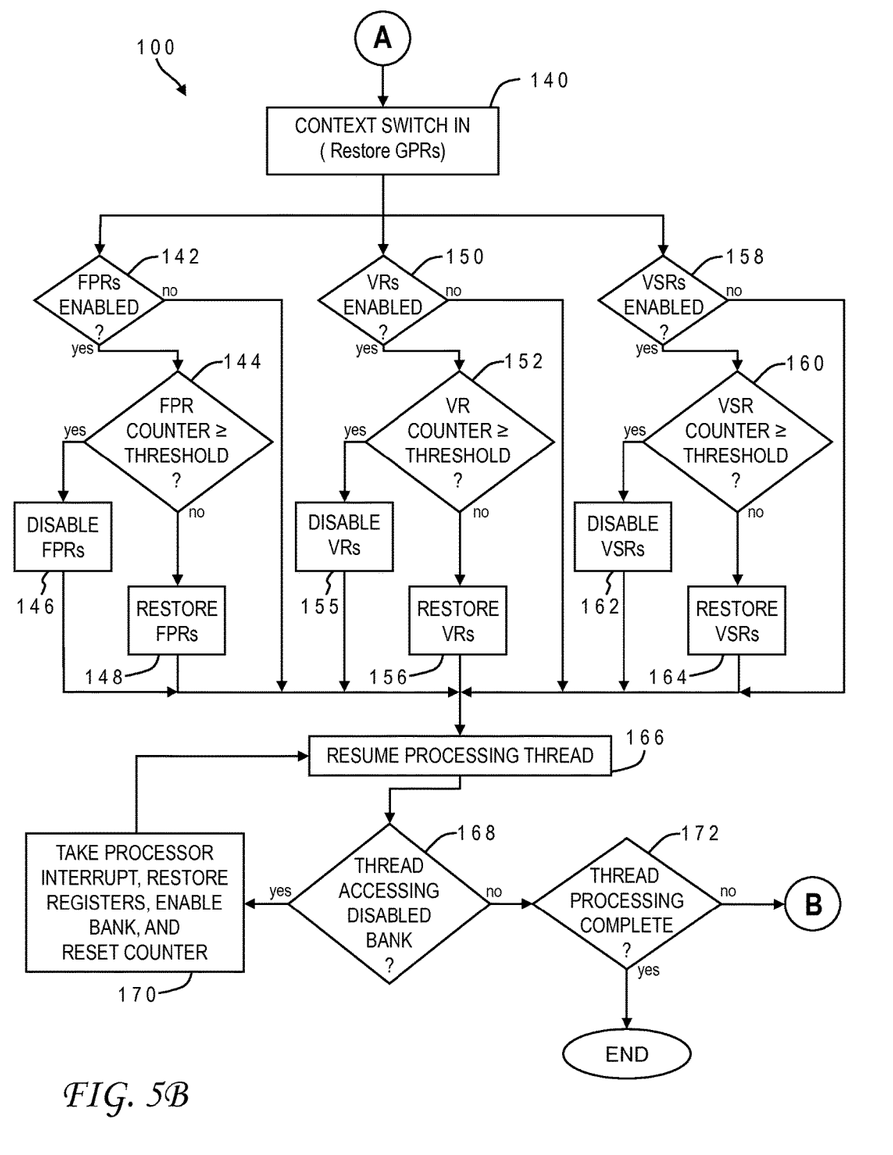

The present invention may be further understood with reference to the chart of FIGS. 5A and 5B which illustrates the logical flow for an intelligent context management process in accordance with one implementation. The process begins by initializing all of the checksums and counters to zero, and enabling all of the register banks for any thread (102). A prioritized thread then begins execution (104). After some period of time of processing the thread, it gets switched out by the OS, e.g., due to its timeslice expiring, an interrupt, an I/O request, yield, etc. (106). In this implementation, the GPRs are always saved on a context switch. However, further processing must take place to determine whether to save the other register states. This determination begins by examining whether each of the targeted facilities is currently enabled for this thread (which they will be for the first context switch because of the initial enable settings in box 102). If the FPRs are enabled (108), that register state is saved, and its checksum is computed and stored (110). If the new FPR checksum is equal to the old checksum (112), the FPR counter is incremented (114). If the checksums are not the same, the FPR counter is reset (116). The same flow occurs for the VRs and the VSRs. If the VRs are enabled (118), that register state is saved, and its checksum is computed and stored (120). If the new VR checksum is equal to the old checksum (122), the VR counter is incremented (124). If the checksums are not the same, the VR counter is reset (126). If the VSRs are enabled (128), that register state is saved, and its checksum is computed and stored (130). If the new VSR checksum is equal to the old checksum (132), the VSR counter is incremented (134). If the checksums are not the same, the VSR counter is reset (136). There is no need to save state information or compute checksums on a context switch out for any units that are still disabled.

The process continues from the "A" bubble in FIG. 5A to the "A" bubble in FIG. 5B. The "A" bubble represents the time period that the thread is not running, for example, the OS decides to run some other thread, wait for I/O, etc., until it becomes time to run this thread again. At such time, there is a context switch in and the GPRs are automatically restored (140). The targeted facilities are then again examined to see whether they are enabled. No action is taken for any facility that has been disabled. If the FPRs are enabled (142), the FPR counter is compared against the threshold value (144). If the counter exceeds the threshold, the FPRs are disabled (146). If the counter has not yet reached the threshold, the FPR state is restored (148). If the VRs are enabled (150), the VR counter is compared against the threshold value (152). If the counter exceeds the threshold, the VRs are disabled (154). If the counter has not yet reached the threshold, the VR state is restored (156). If the VSRs are enabled (158), the VSR counter is compared against the threshold value (160). If the counter exceeds the threshold, the VSRs are disabled (162). If the counter has not yet reached the threshold, the VSR state is restored (164). Once any required facilities have been restored, the thread resumes processing (166). If the thread attempts to access a register bank that has been disabled (168), the processor takes an interrupt, restores the requested registers, enables the register bank, and resets the counter for the bank to zero (170). If thread processing completes (172), the thread management process ends. Otherwise, the process continues iteratively at the "B" bubble, representing the time period that the thread is running until it gets switched out again by the OS.

Those skilled in the art will appreciate that the key value of this self-optimizing, self-tuning state management is how it adapts to changes in workload behavior and CPU functional unit utilization. The efficiencies are particularly significant for systems using transactional memory. With conventional lazy state management every time a thread using transactional memory is context switched out, access to the FPU, VMX, and VSX is removed until the thread needed to use them again. After the next dispatch, if the thread's first use came underneath a transaction, the processor not only has to take an interrupt to do the lazy context restore but it further aborts the transaction, which must be restarted. In the worst case, the thread is trying to use all three of the units in order underneath the transaction, so following a redispatch it could encounter three interrupts and three aborted/restarted transactions. The new approach of more intelligent context management based on a determination of frequency of use is not only more generally efficient but also helps to avoid this interference with transactional memory.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, while the preferred implementation always restores GPRs and selectively restores only the FPRs, VRs, and VSRs, a processor could utilize the invention to selectively restore any combination of register banks or other facilities. It is therefore contemplated that such modifications can be made without departing from the spirit or scope of the present invention as defined in the appended claims.

What is claimed is:
1. A method of intelligent context management for thread switching in a processing unit having execution units and register banks used by the execution units, the method comprising:
   determining that a given register bank has not been used by a particular thread for a predetermined number of dispatches of the particular thread; and responsive to said determining, disabling the given register bank for use by the particular thread while still enabling the given register bank for at least one other thread, wherein disabling of said given register bank includes not restoring a context of said given register bank for a dispatch of the particular thread and includes not saving the context of said given register bank when the particular thread is switched out of the processor core.

2. The method of claim 1 wherein said determining includes:
inferring after a current dispatch of the particular thread that the particular thread has not used the given register bank since a previous dispatch of the particular thread; and
responsive to said inferring, incrementing a counter corresponding to the particular thread and the given register bank beyond a predetermined threshold.

3. The method of claim 2 wherein said inferring includes:
storing a previous checksum for a state of the given register bank from the previous dispatch; and
establishing that a current checksum for a state of the given register bank from the current dispatch is equal to the previous checksum.

4. The method of claim 1 wherein said determining and said disabling are controlled by operating system software of a computer system which includes the processing unit.

5. The method of claim 1 wherein processing of the particular thread begins with all of the register banks enabled.

6. The method of claim 1 wherein:
the register banks include general purpose registers, floating point registers, vector registers, and vector-scalar registers; and
said disabling selectively disables one of said floating point registers, said vector registers, and said vector-scalar registers.

7. The method of claim 3 further comprising, prior to said determining and said disabling:
storing a last saved checksum for the state of the given register bank;
switching out a thread context of the processing unit after said storing;
confirming that a new checksum for the state of the given register bank after said switching does not match the last saved checksum; and
responsive to said confirming, resetting the counter to zero.

8. A method of intelligent context management for thread switching in a processing unit having execution units and register banks used by the execution units, the method comprising:
determining that a given register bank has not been used by a particular thread for a predetermined number of dispatches of the particular thread, wherein the predetermined number is programmable and is dynamically set based on the particular thread's usage of said given register bank in real time; and
responsive to said determining, disabling the given register bank for use by the particular thread.

9. The method of claim 8 wherein the predetermined number is set accordingly to a number of dispatches that occur between successive uses of a particular one of the execution units by the particular thread.

* * * * *